US008459707B2

(12) United States Patent
Lipscomb et al.

(10) Patent No.: US 8,459,707 B2
(45) Date of Patent: *Jun. 11, 2013

(54) SIFTING PET WASTE SCOOP

(75) Inventors: John M. Lipscomb, Cedarburg, WI (US); Qing He, North Andover, MA (US)

(73) Assignee: Pioneer Pet Products, LLC, Cedarburg, WI (US)

( * ) Notice: Subject to any disclaimer, the term of this patent is extended or adjusted under 35 U.S.C. 154(b) by 256 days.

This patent is subject to a terminal disclaimer.

(21) Appl. No.: 13/068,843

(22) Filed: Mar. 29, 2010

(65) Prior Publication Data

US 2012/0025549 A1 Feb. 2, 2012

(51) Int. Cl.
*A01K 29/00* (2006.01)

(52) U.S. Cl.
USPC .......................................... 294/1.3; 294/179

(58) Field of Classification Search
USPC ..... 294/179, 1.3, 1.4, 1.5, 176, 180; 119/161; 209/417, 418, 419; 210/473–482, 238, 464, 210/465, 470, 497.01, 800; 73/426–429; 99/413, 508; D7/667–668, 400; D10/46.2
See application file for complete search history.

(56) References Cited

U.S. PATENT DOCUMENTS

| | | | | |
|---|---|---|---|---|
| 3,354,575 A | * | 11/1967 | Darrow | 43/56 |
| 5,536,055 A | * | 7/1996 | Kohn | 294/1.3 |
| 5,921,596 A | * | 7/1999 | Sheriff et al. | 294/1.4 |
| 6,022,058 A | | 2/2000 | O'Rourke | |
| 6,039,887 A | * | 3/2000 | Licari | 210/800 |
| D437,192 S | * | 2/2001 | Verherbrugghen et al. | D7/691 |
| 6,416,097 B1 | * | 7/2002 | O'Rourke | 294/179 |
| D467,472 S | * | 12/2002 | de Vries | D7/667 |
| 6,578,807 B1 | | 6/2003 | Lipscomb et al. | |
| 6,976,661 B2 | | 12/2005 | Lipscomb et al. | |
| D533,471 S | * | 12/2006 | Jordan | D10/46.2 |
| 7,686,360 B2 | * | 3/2010 | Platt | 294/1.3 |
| D619,427 S | * | 7/2010 | Poteet | D7/667 |
| D628,861 S | * | 12/2010 | Lane | D7/667 |
| 2005/0076845 A1 | | 4/2005 | Langdale | |
| 2006/0156991 A1 | | 7/2006 | Burns | |
| 2006/0180512 A1 | * | 8/2006 | Allen | 209/418 |
| 2007/0267333 A1 | | 11/2007 | Delman | |

* cited by examiner

*Primary Examiner* — Saul Rodriguez
*Assistant Examiner* — Gabriela Puig
(74) *Attorney, Agent, or Firm* — Boyle Fredrickson, S.C.

(57) ABSTRACT

A pet waste scoop, e.g., cat litter scoop, having a relatively large mouth opening includes body having an open end opposite a closed end and defining an interior therebetween for receiving pet waste for easy disposal thereof. A handle is integrally formed with the body and extends downwardly toward the closed end a predetermined distance such that the user may easily grasp the handle for manipulating the pet waste scoop while maintaining his or her hand a safe distance from the pet waste to be scooped. A plurality of elongate slot-shaped apertures that can be curvilinear are formed within a front surface opposite the handle for sifting the litter scooped with the pet waste scoop. The apertures are defined by a number of rounded elongate sifting bars that also can be of curvilinear construction and configured to prevent pet waste and/or litter build up within the apertures.

21 Claims, 4 Drawing Sheets

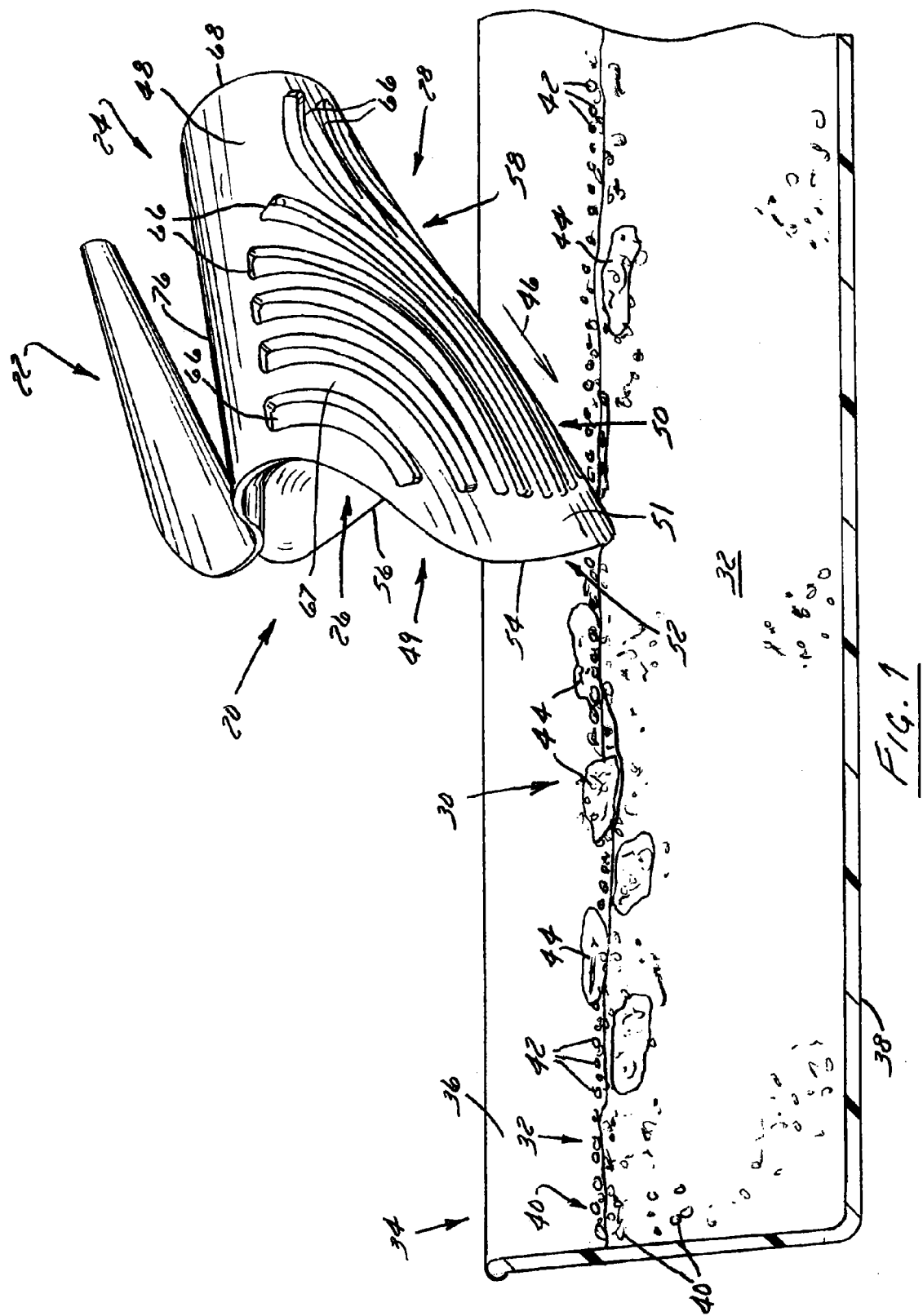

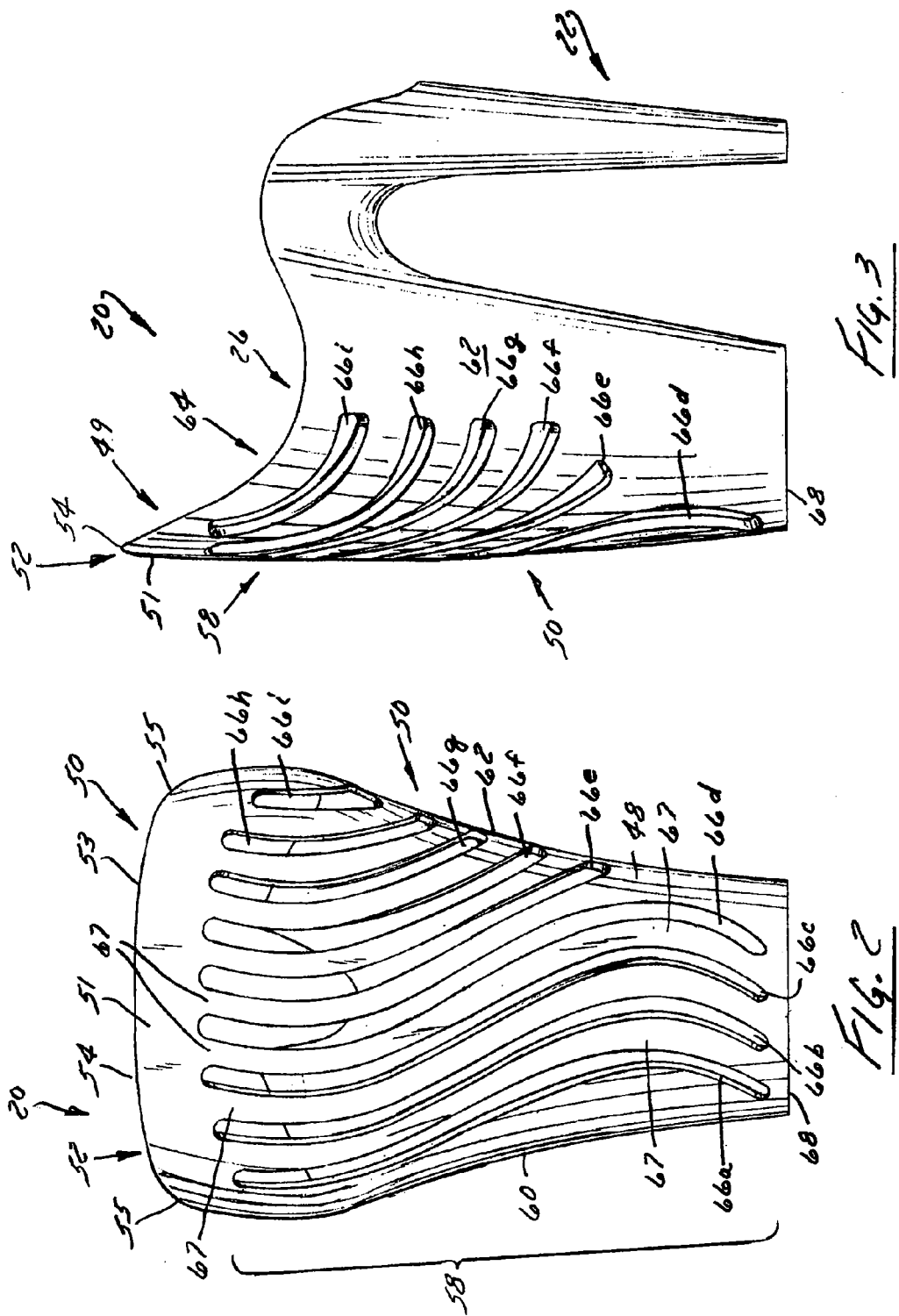

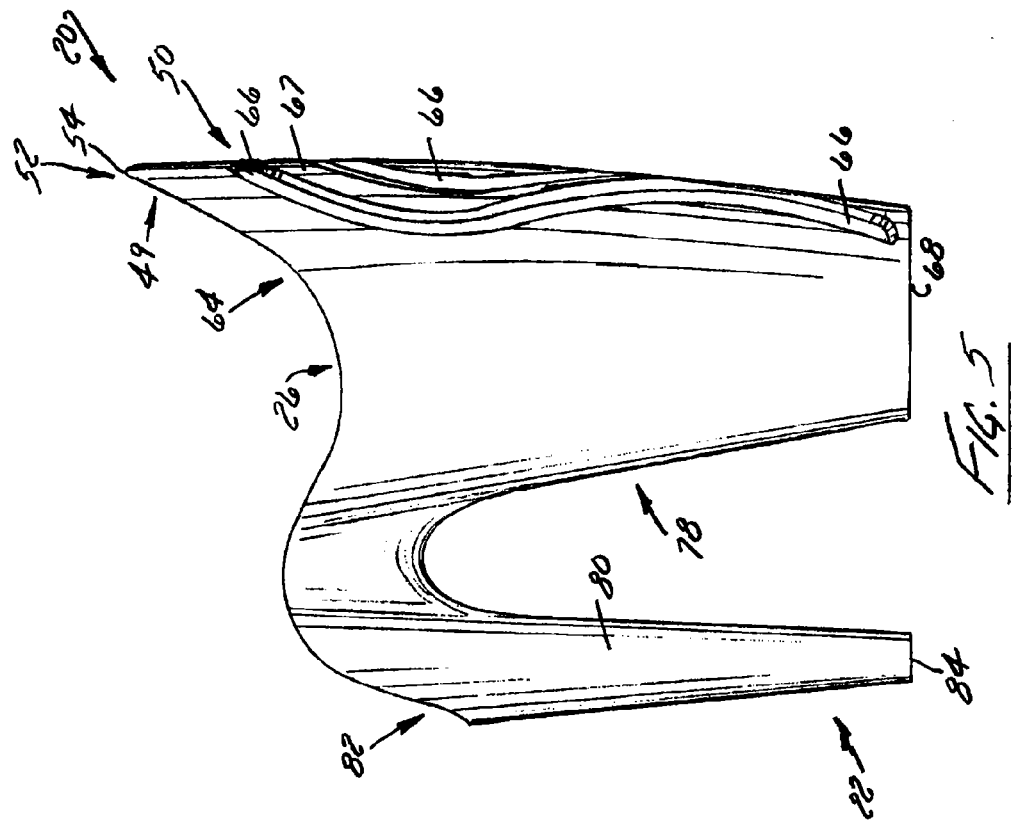
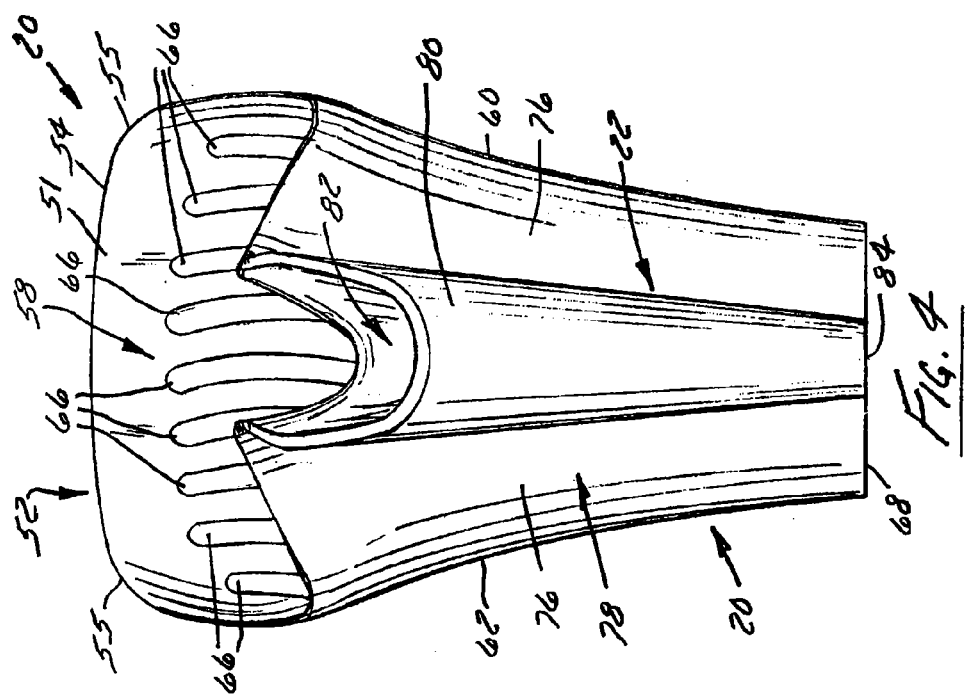

SIFTING PET WASTE SCOOP

FIELD OF THE INVENTION

The present invention relates to a pet waste scoop, e.g., cat litter scoop, and more particularly a pet litter scoop of perforate and sifting construction.

BACKGROUND

Pet waste scoops that permit a user to scoop pet waste and pet litter and sift the pet litter such that it is returned to its original location such that only the pet waste is retained by the scoop are well known and there have been a number of commercially successful pet waste scoops. Exemplary pet waste scoops generally include a handle for manipulating the scoop attached to a body. The body generally defines an open end opposite a closed end. The open end generally includes a lip that extends outwardly from the body a distance greater than an opposing surface of the body. The lip is generally configured for scooping the pet waste and litter as is generally understood. The body further includes a surface having a number of slits or apertures therein. The slits and apertures are sized and spaced from one another such that when the user scoops the pet waste and surrounding litter, the pet waste is retained within the interior of the scoop defined by the body while the litter is sifted through the slits or apertures and back into its original location such as, for example, a litter box.

These known prior art devices suffer from a number of disadvantages. For example, known pet waste scoops typically provide a gripping surface of the handle near the open end of the body. Accordingly, the user's hands may be disadvantageously positioned such that the user's hands may become soiled by the pet waste during the scooping thereof. In addition, known prior art scoops do not adequately trap large pieces of pet waste, and these large pieces of pet waste can preclude or inhibit the sifting of the litter through the slits or apertures such that it takes the user an inordinate amount of time to sift the litter and pet waste. Accordingly, oftentimes a user will have to manipulate the scoop or even the waste such that the slits or apertures are not clogged. Again, this may lead to the user having his or her hands soiled when using prior art scoops. Finally, the bars defining the slits or apertures in the body of prior known pet waste scoops are typically flat and thus retain a portion of the pet litter even after sifting. Accordingly, this retained portion of pet litter is susceptible to becoming stuck to the sifting bars and thus clogging the slits or apertures for subsequent uses, or the retained pet litter may be moved along with the scoop to another location after use and thereafter may undesirably fall from the scoop at this other location such that this other location becomes soiled with pet litter thereby requiring further clean up on the part of the user.

It therefore would be desirable to provide pet waste scoop that is relatively simple in construction and operation and that does not suffer from the foregoing recited disadvantages. Accordingly, a pet waste scoop having a handle advantageously positioned at a predetermined distance form an open end of the body of the scoop is desired. Further, a scoop that is configured and adapted for handling relatively large amounts of pet waste is additionally desired. In addition, a pet waste scoop that is configured such that the pet litter does not become stuck or otherwise retained within the scoop is likewise desired.

SUMMARY

The present invention is directed to a pet waste scoop. The pet waste scoop includes a body that defines a closed end at a bottom thereof opposite an open end at a top thereof. The body defines an interior between the open end and closed end for receiving pet waste therein. The open end defines a relatively wide opening as compared to the closed end whereby the diameter of the interior decreases from the open end to the closed end. A handle for grasping by the user is integrally formed with the body. The handle extends from a rear wall of the body and extends from the open end toward the closed end of the body. The handle is positioned at a predetermined distance from the open end such that the user is capable of grasping the handle about a grasping portion in a manner such that the user's hand is sufficiently far from the open end so as to avoid contact with pet waste to be scooped thereby. The open end of the body defines a scooping lip that is integrally formed with the front surface and that protrudes a predetermined distance upwardly from the open end of the body. The body also includes a number of elongate apertures formed in the front surface for sifting the pet waste and surrounding waste retaining material such as, for example, pet litter or sifting sand and a substantially solid rear surface opposite the front surface. The plurality of elongate apertures are defined by a plurality of spaced apart sifting bars. The sifting bars comprise a generally rounded shape such that pet waste and litter is incapable of becoming adhered thereto and to thereby block the apertures. Rather, the rounded shape permits litter and waste to simply slide off of the sifting bars such that the apertures remain unclogged without user intervention.

Various other features, advantages and objects of the present invention will be made apparent from the following detailed description and the drawings.

DRAWING DESCRIPTION

Preferred exemplary embodiments of the invention are illustrated in the accompanying drawings in which like reference numerals represent like parts throughout and in which:

FIG. 1 is a perspective view of a pet waste scoop according to the present invention shown in a use position with a litter box, e.g., cat litter box, to scoop and sift fecal matter and/or excrement clumps from unused litter to return the unused litter to the litter box for use or re-use;

FIG. 2 is a front elevation view of the pet waste scoop of FIG. 1 showing a litter-engaging surface of the scoop;

FIG. 3 is a right side elevation view of the pet waste scoop of FIG. 1;

FIG. 4 is a rear elevation view of the pet waste scoop of FIG. 1;

FIG. 5 is a left side elevation view of the pet waste scoop of FIG. 1;

DETAILED DESCRIPTION

Figure 6:
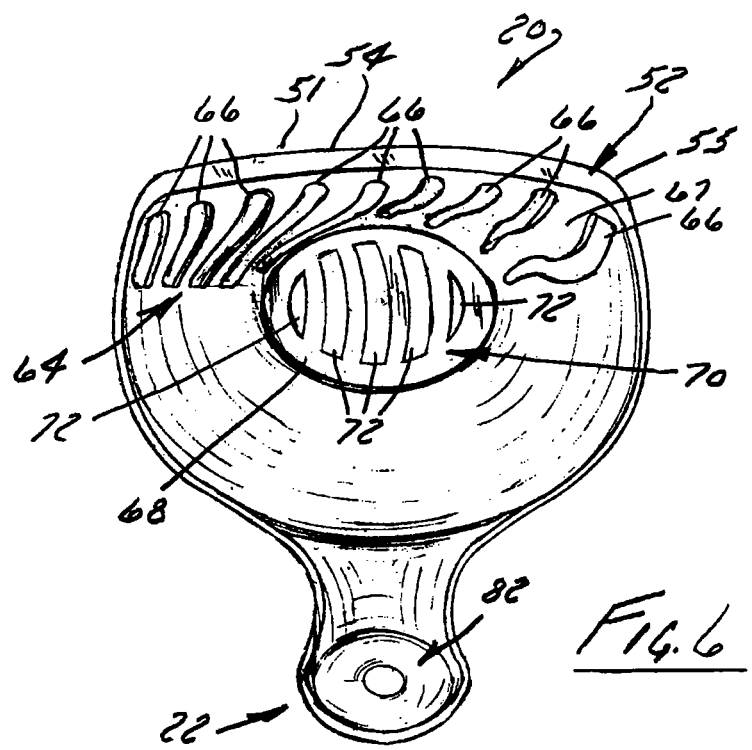
FIG. 6 is a top plan view of the pet waste scoop of FIG. 1.

Referring now to the drawings, and initially FIG. 1, a pet waste scoop 20 constructed in accordance with the present invention is illustrated. Pet waste scoop 20 includes a handle 22 extending outwardly from a scoop body 24 which includes a waste-retaining pocket 26 formed therein that includes a perforate sifting portion 28 configured to sift waste 30 from granular material 32. Such a pet waste scoop 20 is well suited for use in sifting animal excrement 30 from granular litter 32, e.g., cat litter, which can be received in a container 34, such as a litter box or the like.

The litter box 34 has sidewalls 36, only one of which is shown in FIG. 1, and a bottom wall 38 forming a container that holds granular litter 32. Such granular litter 32 can be of excrement absorbing composition, such as a clumping litter made of granulated bentonite, e.g., calcium bentonite, quartz-bentonite mixture, or diatomaceous earth-bentonite mixture, or silica based litter, e.g., silica gel or silica crystal litter. Such a litter box 34 typically contains at least a plurality pairs of layers 40 of litter granules 42 that form clumps 44 when animal excrement is absorbed by the litter. Clumps 44 refers to clumps of fecal matter as well as litter that has absorbed animal urine and clumped together.

As is depicted in FIG. 1, a user grasps the scoop 20 by its handle 22 and moves it along an arcuate path, indicated by arrow 46, to scoop up litter 32 and sift it to return the unused litter granules 42 to the litter box 34 while retaining clumps 44 in the scoop 20 for subsequent disposal. A waste scoop 20 constructed in accordance with the present invention more efficiently separates unused litter 32 from excrement clumps 44 so that the clumps 44 can be thrown away and the unused litter 32 returned to litter box 34. As described in more detail below, such a scoop 20 does so in a manner that minimizes stirring up dust that can frequently occur when cleaning a litter box 34. Such a scoop 20 preferably is of one-piece, unitary and substantially homogenous construction being constructed of a relatively lightweight and durable material, such as plastic or the like. Other suitable materials of construction include steel, e.g., stainless steel, ceramic or porcelain, a composite material, or another suitable material.

Scoop body 24 has a sidewall 48 open at one end defining a mouth 49 through which waste 30 and litter 32 enters during scooping and sifting. Scoop sidewall 48 can be of endless construction having a litter engaging face 50 with an outwardly extending tongue 52 terminating in a transversely extending portion 54 of a peripheral edge 56 that defines mouth 49. Litter engaging face 50 also has an elongate perforate sifting portion 58 inboard of the tongue 52 through which unused litter passes back into container 34 during scoop operation.

Tongue 52 can be an imperforate margin 51 disposed outwardly of sifting portion 58. Tongue 52 helps facilitate insertion of scoop 20 into litter 32 and can be configured with its transversely extending tongue edge 54 tapered at its leading litter contacting edge to further help facilitate insertion as depicted in FIGS. 3 and 5. Tongue 52 can also help guide any clumps 44 and litter 32 entering scoop 20 toward sifting portion 58. Tongue edge 54 can have a flat central region 53 and be curved at each end 55 such as shown in FIG. 2 along a generally transverse direction to further help guide litter 32 entering the mouth 49 toward sifting portion 58.

Litter engaging face 50 can be bordered by spaced apart sides 60, 62 of wall 48 that together with the litter engaging face 50 define a channel 64 that guides litter 32 entering mouth 49 over and along sifting portion 58 as scoop 20 is inserted into litter 32 in container 34, scoops up litter 32, and is raised out of the container 34. Litter engaging face 50 and sides 60, 62 can be continuous and interconnected as depicted in FIGS. 2 and 4 and sifting portion 58 can extend into part of one or both sides.

Channel 64 is elongate and tapers in a manner that narrows the channel 64 downstream of mouth 49 helping to ensure a continuously lessening amount of litter being sifted is directed over the sifting portion 58. To help optimize sifting, sifting portion 58 can extend from tongue 52 substantially the length of the channel 64 and channel 64 can continuously taper substantially the length of channel 64. As shown in the drawing figures, sifting portion 58 can extend substantially the length of scoop 20 and channel 64 can continuously taper substantially the length of the scoop 20. As a result of such a tapering channel construction, sifting efficiency is optimized by continuously directing an increasingly lessening amount of litter in the scoop 20 toward sifting portion 58 during the scooping of litter from the container and during lifting of the scoop 20 upwardly out of the container.

Sifting portion 58 is an elongate perforate section formed in the litter contacting face 50 of the scoop 20 that engages litter during use of the scoop 20. Perforate sifting portion 58 is formed by at least a plurality of pairs, i.e., at least three, elongate slots 66 that extend completely through scoop body sidewall 48 defining sifting rake tines 67 therebetween interconnected by tongue 52 to impart strength and structural rigidity to sifting tines 67 (FIG. 2). Each slot 66 is oriented with its longitudinal extent in the same general direction that scoop 20 is moved during scooping to expedite distribution of clumps and litter scooped up over the entire surface area of the sifting portion 58 as quickly as possible.

Slots 66 have a width greater than the width or diameter of a plurality of litter grains 42. In a preferred embodiment, each slot 66 has a width that is at least a plurality of pairs, i.e., at least three, times the average width or diameter of a plurality of litter granules 42. In one preferred embodiment, standard absorbent cat litter has an average granule width or diameter of about one millimeter with sizes varying between one-half millimeters to as great as two millimeters within typical cat litter with each slot 66 having a width of about five millimeters and can range in slot width between four and six millimeters.

As a result, sifting occurs even during downward movement of the scoop 20 into litter in the container. Due to more rapid occurrence of sifting and the more efficient sifting that takes place, sifting is nearly finished as the scoop 20 is being lifted or withdrawn from litter in the container 34. By completing sifting more quickly, unused litter sifted from the clumps drops a shorter distance from the scoop 20 back into the container 34 thereby advantageously resulting in less dust production.

Each sifting slot 66 can be of non-straight construction such being curved or having a curved portion, such as is shown in FIGS. 1-5. For example, each slot 66 can have a generally longitudinally extending portion at or adjacent scoop mouth 49 that can be straight thereat with a subsequently extending portion being curved. With reference to FIG. 2, sifting portion 58 can include a plurality of pairs of generally S-shaped slots 66a-d and a plurality of pairs of slots 66e-i that curve toward one side of the channel 64. Such curved slot construction encourages granular litter particle movement in a direction transverse to the direction of scoop movement during scooping and sifting. Such curved slot construction also ensures granular litter entering the scoop mouth 49 and moving longitudinally relative to the scoop 20 in the scoop 20 encounters open sifting surface area of at least one slot 66 and typically at least a plurality of slots 66.

Such curved litter grain or particle agitating slots 66 helps encourage flow of unused litter through slots 66 of the sifting portion 58 in a fluid-like manner increasing sifting speed. This further helps complete sifting for a given volume of matter entering the scoop 20 in a shorter amount of time. Force and effort required to sift a given amount of material is also advantageously reduced.

Figure 7:
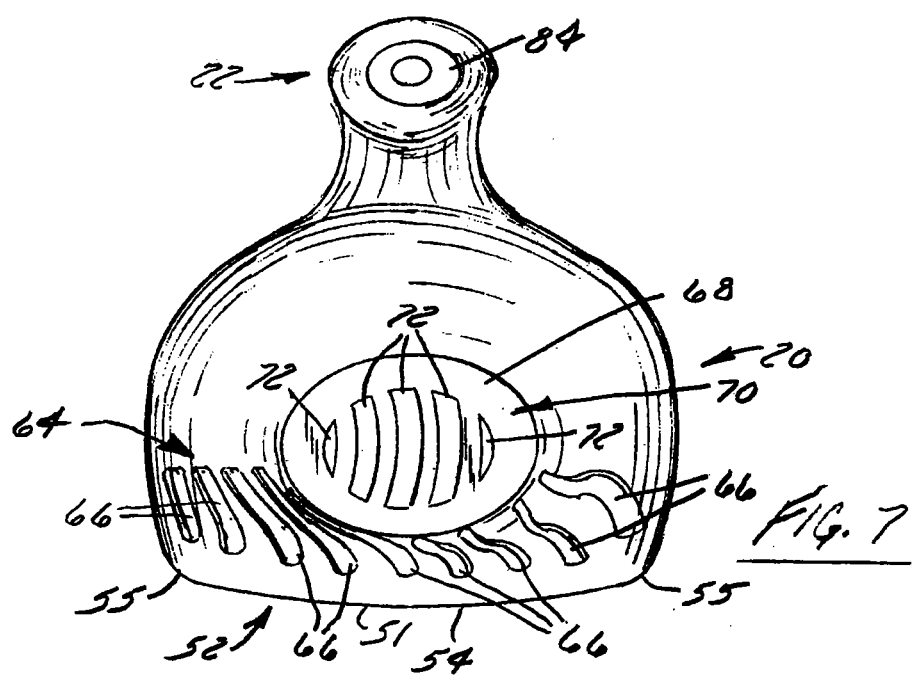
FIG. 7 is a bottom plan view of the pet waste scoop of FIG. 1.

Scoop body wall 48 can be of endless construction defining a pocket 26 in the form of tubular sifting cup that can have an endwall 68 upon which the scoop 20 can be uprightly stood. Endwall 68 can include a second perforate sifting portion 70 formed therein that sifts any clumps 44 and granular litter material 32 remaining in the scoop 20 that has passed beyond the sifting slots 66 of the first sifting portion 58. Second sifting portion 70 can by formed of a plurality of pairs of apertures 72 that can be slots that extend completely through the scoop endwall 68. Apertures 72 can be parallel and curved, such as depicted in FIGS. 6 and 7. Second sifting portion 70 further facilitates and expedites litter sifting.

Scoop body wall 48 can be configured with an imperforate portion 76 disposed between handle 22 and wall 48 thereby providing a handle shield 78 that helps prevent the hand of a person gripping the handle 22 during use of scoop 20 to come into contact with litter or excrement clumps. Handle 22 has an elongate handle grip 80 that extends generally longitudinally overlying at least a substantial part of the first sifting portion 58 when the litter engaging face 50 is engaging litter in container during scoop use. Handle grip 80 can extend generally parallel to litter engaging face 50 as shown in FIG. 5. Handle grip 80 can be tubular with openings 82, 84 at each end enabling any litter entering leading opening 82 during scooping to exit trailing opening 84 and returning to container 34.

It is also to be understood that, although the foregoing description and drawings describe and illustrate in detail one or more preferred embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims.

It is claimed:

1. A pet waste scoop comprising:
a handle extending alongside a tubular pet waste retaining cup comprised of an endless sidewall having an imperforate longitudinally extending handle shield disposed alongside the handle and a litter engaging face disposed opposite the handle shield and the handle with the litter engaging face having an elongate perforate waste sifting region extending substantially the length of the litter engaging face that is comprised of a plurality of pairs of spaced apart elongate longitudinally extending sifting slots and tines with each adjacent pair of sifting slots spaced apart by a corresponding one of the tines;
and wherein the plurality of pairs of sifting slots and tines are joined at or adjacent a mouth of the pet waste retaining cup by an interconnecting tongue having a tapered leading litter-contacting outer edge.

2. The pet waste scoop of claim 1 wherein the handle shield overlies the perforate waste sifting region and the handle overlies the handle shield and the perforate waste sifting region when the pet waste scoop is disposed in a generally horizontal waste scooping position.

3. The pet waste scoop of claim 1 wherein a plurality of the sifting slots are generally S-shaped.

4. The pet waste scoop of claim 1 wherein each one of the sifting slots is of non-straight construction for separating unused granular material from which waste is being sifted during scooping allowing passage of unused granular material through the sifting slots.

5. The pet waste scoop of claim 4 wherein each one of the sifting slots has at least one curved section for sifting granular material to facilitate sifting during scooping.

6. The pet waste scoop of claim 1 wherein the pet waste retaining cup comprises an end wall having a second waste sifting region formed therein that is generally transverse to the handle.

7. The pet waste scoop of claim 6 wherein the end wall provides a support surface upon which the pet waste scoop can be stood uprightly.

8. The pet waste scoop of claim 7 wherein the second sifting region comprises a plurality of elongate sifting slots.

9. The pet waste scoop of claim 1 wherein the pet waste retaining cup has an open mouth disposed at one end and a necked down portion disposed adjacent an opposite end that increases the effective area of the perforate waste sifting region as granular waste carrying material travels farther into the cup.

10. The pet waste scoop of claim 9 wherein the pet waste retaining cup is funnel shaped defining a perforate waste sifting region that is wider adjacent the mouth of the cup than adjacent the end of the cup opposite the mouth.

11. The pet waste scoop of claim 10 wherein the waste sifting funnel has a plurality of spaced apart longitudinally extending elongate litter sifting perforations.

12. The pet waste scoop of claim 11 wherein each one of the plurality of spaced apart elongate litter sifting perforations is a slot elongated in the direction of scooping and having a portion that is curvilinear transversely relative to the direction of scooping.

13. The pet waste scoop of claim 1 wherein the tongue has a generally flat central region with a pair of curved portions extending along opposite sides of the tongue.

14. The pet waste scoop of claim 13 wherein the perforate waste sifting region is generally flat and widest along the tongue and narrows toward an end of the pet waste retaining cup opposite the mouth.

15. A pet waste scoop comprising a tubular pet waste retaining cup formed of an endless sidewall having a handle shield carrying a longitudinally extending handle and a litter engaging face opposite the handle shield having an elongate longitudinally extending perforate waste sifting region comprised of a plurality of generally S-shaped elongate sifting slots formed therein extending generally longitudinally from adjacent an outer edge of a generally flat transversely extending portion of the litter engaging face disposed adjacent a mouth of the pet waste retaining cup toward a bottom of the cup where a width of the perforate waste sifting region narrows.

16. The pet waste scoop of claim 15 wherein the pet waste retaining cup necks down from adjacent the mouth of the cup toward the bottom of the cup defining a funnel-shaped cup.

17. The pet waste scoop of claim 15 further comprising a tongue having an imperforate margin extending along the outer edge of the litter engaging face disposed adjacent the mouth with the generally flat transversely extending portion of the litter engaging facing defining a generally flat central region of the tongue.

18. The pet waste scoop of claim 15 wherein the bottom of the cup comprises a second perforate sifting region extending generally transversely to the handle having a plurality of elongate sifting slots formed therein.

19. The pet waste scoop of claim 18 wherein the bottom of the cup is generally flat defining a base upon which the pet waste scoop can rest on a substantially flat surface.

20. A pet waste scoop comprising a tubular funnel-shaped pet waste retaining cup formed of an endless sidewall having an imperforate handle shield carrying a longitudinally extending handle and a litter engaging face opposite the handle shield having an elongate longitudinally extending perforate waste sifting region comprised of a plurality of pairs of generally elongate sifting slots formed therein extending generally longitudinally from adjacent an outer edge of a generally flat transversely extending portion of the litter engaging face disposed adjacent a mouth of the cup toward a perforate sifting bottom of the cup where a width of the perforate waste sifting region narrows, and wherein the bottom of the cup is generally flat forming a pedestal upon which the pet waste scoop can rest uprightly on a generally flat surface.

21. The pet waste scoop of claim 20 further comprising a tongue having an imperforate margin extending along the outer edge of the litter engaging face disposed adjacent the mouth with the generally flat transversely extending portion of the litter engaging facing defining a generally flat central region of the tongue.

\* \* \* \* \*